United States Patent
Schmidt

(10) Patent No.: US 8,470,457 B2
(45) Date of Patent: Jun. 25, 2013

(54) COMPOSITE ARTICLE HAVING A SOLID SOLUTION PROTECTIVE LAYER

(75) Inventor: Wayde R. Schmidt, Pomfret Center, CT (US)

(73) Assignee: United Technologies Corporation, Hartford, CT (US)

( * ) Notice: Subject to any disclaimer, the term of this patent is extended or adjusted under 35 U.S.C. 154(b) by 445 days.

(21) Appl. No.: 12/748,910

(22) Filed: Mar. 29, 2010

(65) Prior Publication Data
US 2011/0236695 A1 Sep. 29, 2011

(51) Int. Cl.
*C04B 35/581* (2006.01)

(52) U.S. Cl.
USPC .................. 428/697; 428/698; 428/699

(58) Field of Classification Search
USPC ................... 428/446, 697, 698, 699
See application file for complete search history.

(56) References Cited

U.S. PATENT DOCUMENTS

| | | | |
|---|---|---|---|
| 4,639,388 A | 1/1987 | Ainsworth et al. | |
| 4,687,657 A * | 8/1987 | Clark et al. | 501/89 |
| 5,229,468 A * | 7/1993 | Jensen | 501/89 |
| 5,272,239 A * | 12/1993 | Jensen | 528/9 |
| 5,577,021 A * | 11/1996 | Nakatani et al. | 428/824.4 |
| 6,284,325 B1 | 9/2001 | Eaton, Jr. et al. | |
| 6,299,988 B1 | 10/2001 | Wang et al. | |
| 6,387,456 B1 | 5/2002 | Eaton, Jr. et al. | |
| 6,485,848 B1 | 11/2002 | Wang et al. | |
| 6,517,960 B1 | 2/2003 | Wang | |
| 6,759,151 B1 | 7/2004 | Lee | |
| 6,911,084 B2 * | 6/2005 | Kouvetakis et al. | 117/103 |
| 7,060,360 B2 | 6/2006 | Eaton et al. | |
| 7,338,202 B1 * | 3/2008 | Kapat et al. | 374/10 |
| 7,374,818 B2 | 5/2008 | Bhatia et al. | |
| 2003/0138641 A1 | 7/2003 | Fukudome et al. | |

FOREIGN PATENT DOCUMENTS

EP 0310043 4/1989

OTHER PUBLICATIONS

Allebrandt et al "Oxidation resistance of SIAICN: H-coatings" Surface & Coatings Tech 201 (2007) p. 5172-5175.*
Li et al " Preparation and mechanical properties of SiC-AlN ceramic alloy" Journal of Materials Science 26 (1991) p. 41813-4817.*
Verdecia, et al., "Aluminum-27 and Silicon-29 Solid-State Nuclear Magnetic Resonance Study of Silicon Carbide/Aluminum Nitride Systems: Effect of Silicon/Aluminum Ratio and Pyrolysis Temperature," Chem. Mater. 1998, American Chemical Society, 1003-1009.
Zangvil, et al, "Alloying of Silicon Carbide with Other Ceramic Compounds—A Review," Ceramic Transactions Silicon Carbide '87, The American Ceramic Society, Inc., 63-82.

* cited by examiner

*Primary Examiner* — Archene Turner
(74) *Attorney, Agent, or Firm* — Carlson, Gaskey & Olds P.C.

(57) ABSTRACT

A composite article includes a substrate and a protective layer disposed on the substrate. The protective layer has a silicon-aluminum-carbon-nitrogen solid solution composition and microstructure.

17 Claims, 1 Drawing Sheet

COMPOSITE ARTICLE HAVING A SOLID SOLUTION PROTECTIVE LAYER

BACKGROUND

This disclosure relates to composite articles having a ceramic protective layer for improved thermal and oxidative protection.

Ceramic and metallic materials, such as superalloys, are attractive materials for use in articles that operate under severe environmental conditions. As an example, gas turbine engine components are subjected to high temperatures, corrosive and oxidative conditions, and elevated stress levels. In order to improve the thermal and oxidative stability of these components, various types of thermal barrier materials have been used to protect the article from the elevated temperature conditions or corrosive/oxidative and stress-producing environments.

SUMMARY

An exemplary composite article includes a substrate and a protective layer disposed on the substrate. The protective layer has a silicon-aluminum-carbon-nitrogen solid solution composition and microstructure.

In another aspect, an exemplary composite article includes a silicon-based ceramic substrate and a protective layer disposed on the substrate. The protective layer has a silicon-aluminum-carbon-nitrogen solid solution composition and microstructure that includes a chemically inter-bonded network of silicon, aluminum, carbon and nitrogen atoms and is substantially free of discrete regions of silicon carbide and aluminum nitride phases. The protective layer includes a filler additive selected from metals/semi-metals, oxides, silicates, or combinations thereof.

An example method of processing a composite article includes forming a protective layer on a substrate, where the protective layer includes a silicon-aluminum-carbon-nitrogen solid solution composition and microstructure.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
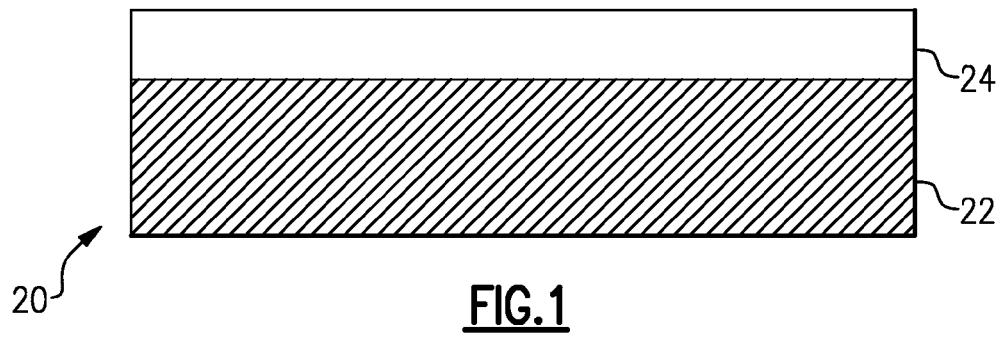
FIG. 1 illustrates an example composite article having a solid solution protective layer.

FIG. 1 illustrates selected portions of an example composite article 20 having improved thermal and oxidative stability, for example. The composite article 20 is not limited to any particular type and may be, for example only, a turbine engine blade or vane, a leading edge of an airfoil, a support structure in a turbine engine, a combustor can or liner, a seal, joint or joining article, a rocket component, a component in contact with exhaust gasses, or other type of aerospace component. Alternatively, the composite article 20 may be for any type of application that would benefit from thermal and/or oxidative stability.

In the illustrated example, the composite article 20 includes a substrate 22 and a protective layer 24 disposed on the substrate 22. Generally, the protective layer 24 protects the underlying substrate 22 from a high temperature environment and/or corrosive and oxidative environmental conditions. In this regard, the protective layer 24 may be a coating on the substrate 22 or a matrix of a ceramic matrix composite, and the substrate 22 may be a fiber in a ceramic matrix composite, the body of a component, a barrier layer that is disposed on the body of a component, a matrix in which the protective layer 24 is disposed or any other type of substrate that would benefit from the protective layer 24.

The substrate 22 may be a silicon-based ceramic material or a metallic material. The silicon-based ceramic material may be silicon carbide (SiC), silicon nitride ($Si_3N_4$), silicon carbonitride, a silicon-carbon-nitrogen-containing ceramic material, or combinations thereof, including oxygen-containing forms of these materials. In other examples, the substrate 22 may be a metallic material, such as a superalloy. For instance, the superalloy may be a nickel-based or cobalt-based alloy. In any case, the substrate 22 requires additional thermal and corrosion/oxidative resistance for the intended end use. In this regard, the protective layer 24 facilitates improving the thermal and oxidative stability of the composite article 20.

The protective layer 24 may be comprised of a ceramic material that includes a silicon-aluminum-carbon-nitrogen ("Si—Al—C—N") solid solution composition and microstructure, which provides thermal and oxidative stability above 1600° C. (2912° F.). The presence of aluminum and nitrogen in a molecular level mixture (i.e., solid solution) with silicon and carbon stabilizes the silicon and carbon such that the Si—Al—C—N solid solution composition and microstructure exhibits thermal and oxidative stability.

In some examples, the protective layer 24 may consist substantially of the Si—Al—C—N solid solution composition and microstructure, along with any impurities. The term "solid solution" may refer to a mutual solubility of silicon carbide and aluminum nitride such that the microstructure is substantially free of discrete regions of silicon carbide and aluminum nitride phases and includes a chemically inter-bonded network of the Si—Al—C—N atoms. The term "inter-bonded" refers to a continuous, covalently bonded network of the Si—Al—C—N atoms. For instance, the chemical structure may be Chemical Structure 1 below.

Chemical Structure 1:

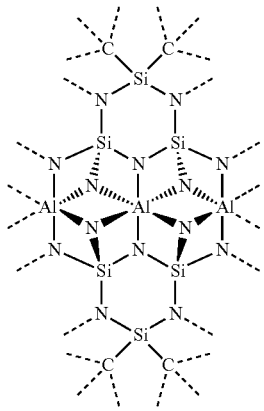

In some examples, the Si—Al—C—N solid solution composition and microstructure additionally includes oxygen. Thus, the protective layer 24 may be a Si—Al—C—N—O solid solution.

Figure 2:
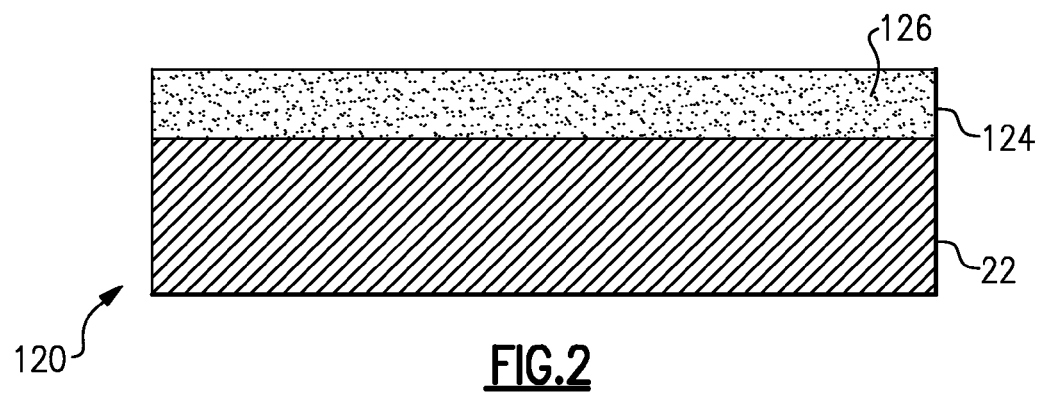
FIG. 2 illustrates another example composite article having a solid solution protective layer.

FIG. 2 illustrates another embodiment of a composite article 120 that is somewhat similar to the composite article 20 of FIG. 1. In this disclosure, like reference numerals designate like elements where appropriate, and reference numerals with the addition of one-hundred or multiples thereof designate modified elements that are understood to incorporate the same features and benefits of the corresponding original elements. In this example, the composite article 120 includes a protective layer 124 disposed on the substrate 22. The protective layer 124 is identical to the protective layer 24 but additionally includes a filler additive 126 that is uniformly dispersed through the Si—Al—C—N solid solution microstructure.

The filler additive 126 may be a metal/semi-metal material, boride material, silicide material, oxide material, silicate material, or mixtures thereof. The metal/semi-metal filler additive may include at least one of boron, silicon, titanium, zirconium, hafnium, vanadium, niobium, tantalum, chromium, molybdenum, tungsten, yttrium, ytterbium, scandium and rhenium. The metal/semi-metal serves as an oxygen scavenger by reacting with available oxygen to form a stable oxide. The reaction with oxygen consumes at least a portion of the oxygen and thereby prevents the oxygen from reacting with elements of the substrate 22 or elements of any other adjacent materials.

The boride material may include at least one boride of titanium, zirconium, hafnium, niobium, vanadium, tantalum and tungsten. The borides are thermally stable and may react with elements of the substrate 22 or oxygen or elements from any adjacent materials to form stable compounds or glasses that further enhance the thermal stability of the composite structure 120.

The silicide material may include at least one silicide of zirconium, hafnium, niobium, vanadium, titanium, tantalum, boron, molybdenum and tungsten. The silicides are thermally stable and may react with elements of the substrate 22 or oxygen or elements from any adjacent materials to form stable compounds or glasses that further enhance the thermal stability of the composite structure 120.

The oxide filler additive may include at least one oxide of boron, silicon, aluminum, titanium, zirconium, hafnium, vanadium, niobium, tantalum, chromium, molybdenum, tungsten, yttrium, ytterbium, scandium or rhenium. The example oxides (whether added as the filler additive or formed from the metal/semi-metal) are thermally stable and may physically expand to self-repair microcracks in the protective layer 124. The oxides may also react with elements of the substrate 22 or elements from any adjacent materials to form stable compounds or glasses that further enhance the thermal stability of the composite structure 120.

The silicate materials may include at least one silicate of titanium, hafnium, tantalum, aluminum, or yttrium. The example silicates are also thermally stable and may self-repair microcracks in the protective layer 124 or react with elements of the substrate 22 or elements from any adjacent materials to form stable compounds or glasses that further enhance the thermal stability of the composite structure 120. One or more of the example elements may form several different types of oxides or silicates, depending on the oxidation state of the example element. The oxides and silicates therefore refer to each oxidation state oxide or silicate, where applicable.

Figure 3:
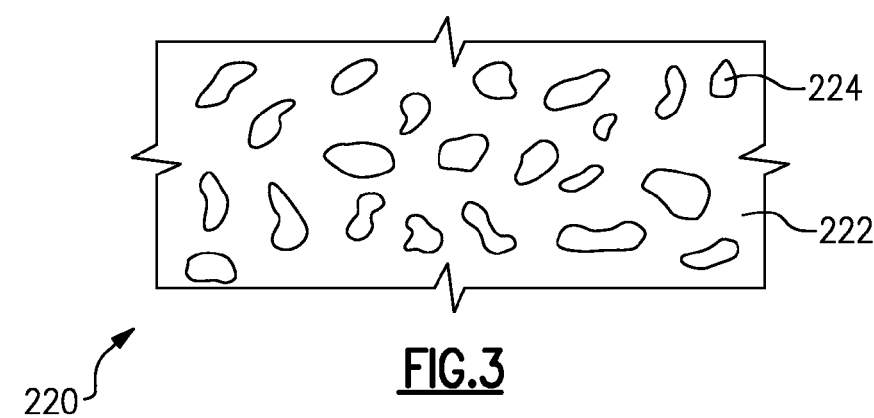
FIG. 3 illustrates another example composite article having a solid solution protective layer.

FIG. 3 illustrates another embodiment of a composite article 220. In this example, the composite article 220 includes a protective layer 224 disposed on a substrate 222, such as within pores of the substrate. In this regard, the protective layer 224 may be considered to be part of a matrix along with the substrate 222. The composite article 220 may therefore include reinforcement or other additives consistent with known ceramic matrix composite structures. The protective layer 224 may be similar to the protective layer 24 or 124 that includes the filler additive 126.

The composition of the Si—Al—C—N solid solution microstructure may be controlled during the fabrication process to tailor the properties of the protective layer 24, 124, 224 for the intended end use. As an example, the composition may be characterized by a ratio, R, of silicon atoms to aluminum atoms in the solid solution microstructure. The ratio, R, of silicon atoms to aluminum atoms may be $0.1 \leq R \leq 10$. As an example, the ratio may be used to stoichiometrically control the type of microstructure that is produced or the conditions under which the protective layer 24, 124, 224 forms. That is, certain ratios may provide properties that are tailored for certain end uses. In some examples, the ratio, R, of $1 \leq R \leq 5$ provides a composition having a desirable degree of thermal and oxidative stability.

An example method of fabricating or processing the composite article 20, 120, 220 may include forming the protective layer 24, 124, 224 having the Si—Al—C—N solid solution composition and microstructure on the substrate 22, 222. That is, the substrate 22, 222 may be pre-fabricated and the protective layer 24, 124, 224 is formed on the pre-fabricated substrate 22, 222. The particular technique selected for forming the protective layer 24, 124, 224 may depend upon the type of substrate 22, 222, the desired end properties of the composite article 20, 120, 220 or a desire to use a certain process. In a few examples, chemical vapor deposition with mixed volatile precursors, physical vapor deposition, thermal spray techniques, electrostatic or electrophoretic methods or pre-ceramic polymer processing may be used. Given this description, one of ordinary skill in the art will be able to recognize advantageous processing methods and parameters to meet their particular needs.

In one example, the forming of the protective layer 24, 124, 224 may include pre-ceramic polymer processing. For instance, the process may include pyrolyzing a single-source pre-ceramic polymer in a relatively inert atmosphere (e.g. nitrogen, argon, helium) in that the pre-ceramic material is not expected to react with the atmosphere during pyrolysis (for excluding oxygen and forming the Si—Al—C—N solid solution composition and microstructure). In another example, an air or oxygen-containing atmosphere may be used to intentionally introduce oxygen into the structure during pyrolysis (for forming the Si—Al—C—N—O solid solution composition and microstructure). The single-source pre-ceramic polymer may be polyaluminosilazane, for example. That is, the single-source may be a single polymeric precursor structure containing the desired ratio R of silicon atoms to aluminum atoms rather than a mixture of two or more pre-ceramic precursor sources. Alternatively, more than one precursor source may be used.

The pyrolysis may be conducted in a known manner, and the pre-ceramic polymer may be prepared in a known manner via reaction between alkylaluminum compounds and substituted cyclic silazanes. If a filler additive 126 is used, the filler additive 126 may be incorporated into the Si—Al—C—N solid solution microstructure or Si—Al—C—N—O solid solution microstructure through the addition of the filler additive 126 during the processing stage. As an example, the filler additive 126 may be physically mixed with the pre-ceramic polymer, provided as an organometallic precursor and physically mixed with the pre-ceramic polymer, or chemically incorporated into the polymer backbone of the pre-ceramic polymer. The use of solvents to improve dispersion of the filler additive 126 is also contemplated. That is, the pre-ceramic polymer or the organometallic precursor may be dissolved in a suitable solvent and mixed to ensure uniform distribution of the components. Following removal of the solvent through controlled heating and/or reduced pressure, a uniform mixture containing pre-ceramic polymer and additive 126 is obtained.

The single-source pre-ceramic polymer provides the benefit of an atomic level mixture of the silicon, aluminum, carbon, and nitrogen atoms such that, upon pyrolysis, a homogenous solid solution microstructure, such as Chemical Structure 1 above, is produced. Additionally, the single-source pre-ceramic polymer can be pyrolyzed at relatively low temperatures below about 1200° C. (2192° F.), which limits thermal influence on the substrate 22, 222. Higher temperatures may also be used to induce advantageous reactions, or structural ordering, but, depending on the processing atmosphere, heating rates and heating times, may result in microstructures having disadvantageous discrete phases or phase separation, stoichiometric excess of one or more of the elements, or substantial volatile loss of one or more of the elements.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A composite article comprising:
a substrate; and
a protective layer disposed on the substrate, the protective layer having a silicon-aluminum-carbon-nitrogen ("Si—Al—C—N") solid solution composition and microstructure, the Si—Al—C—N solid solution microstructure having a chemical structure:

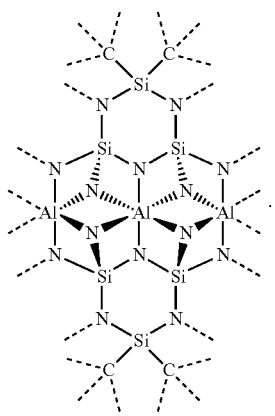

2. The composite article as recited in claim 1, wherein the Si—Al—C—N solid solution composition and microstructure is substantially free of discrete regions of silicon carbide and aluminum nitride phases, and the Si—Al—C—N solid solution microstructure comprises a chemically inter-bonded network of silicon, aluminum, carbon, and nitrogen atoms.

3. The composite article as recited in claim 1, wherein the Si—Al—C—N solid solution composition and microstructure additionally includes oxygen.

4. The composite article as recited in claim 1, wherein the protective layer includes a filler additive selected from a group consisting of metals/semi-metals, borides, silicides, oxides, silicates and combinations thereof.

5. The composite article as recited in claim 4, wherein the filler additive is the metal/semi-metal and is selected from a group consisting of boron, silicon, titanium, zirconium, hafnium, vanadium, niobium, tantalum, chromium, molybdenum, tungsten, yttrium, ytterbium, scandium, rhenium, and combinations thereof.

6. The composite article as recited in claim 4, wherein the filler additive is the boride, and the boride includes at least one element selected from a group consisting of titanium, zirconium, hafnium, niobium, vanadium, tantalum and tungsten.

7. The composite article as recited in claim 4, wherein the filler additive is the silicide, and the silicide includes at least one element selected from a group consisting of zirconium, hafnium, niobium, vanadium, titanium, tantalum, boron, molybdenum and tungsten.

8. A composite article as recited in claim 4, wherein the filler additive is the oxide, and the oxide includes at least one element selected from a group consisting of boron, silicon, aluminum, titanium, zirconium, hafnium, vanadium, niobium, tantalum, chromium, molybdenum, tungsten, yttrium, ytterbium, scandium and rhenium.

9. The composite article as recited in claim 4, wherein the filler additive is the silicate, and the silicate includes at least one element selected from a group consisting of titanium, hafnium, tantalum, aluminum and yttrium.

10. The composite article as recited in claim 4, wherein the filler additive is the silicate, and the silicate includes at least one element selected from a group consisting of titanium, hafnium, tantalum, and yttrium.

11. A composite article as recited in claim 4, wherein the filler additive is the oxide, and the oxide includes at least one element selected from a group consisting of boron, titanium, hafnium, vanadium, niobium, tantalum, chromium, molybdenum, tungsten, ytterbium, scandium and rhenium.

12. The composite article as recited in claim 4, wherein the filler additive is the metal/semi-metal and is selected from a group consisting of boron, hafnium, vanadium, niobium, tantalum, chromium, molybdenum, tungsten, yttrium, ytterbium, scandium, rhenium, and combinations thereof.

13. The composite article as recited in claim 1, wherein the Si—Al—C—N solid solution microstructure has a ratio, R, of silicon atoms to aluminum atoms that is $0.1 \leq R \leq 10$.

14. A composite article comprising:
a silicon-based ceramic substrate; and
a protective layer disposed on the substrate, the protective layer having a silicon-aluminum-carbon-nitrogen ("Si—Al—C—N") solid solution composition and microstructure that comprises a chemically inter-bonded network of silicon, aluminum, carbon, and nitrogen atoms and that is substantially free of discrete regions of silicon carbide and aluminum nitride phases, and the protective layer includes a filler additive selected from silicides.

15. The composite article as recited in claim 14, wherein the silicon-based ceramic is selected from a group consisting of silicon carbide, silicon nitride, silicon carbonitride, silicon-carbon-nitrogen-containing ceramics, combinations thereof, and oxidized forms thereof.

16. The composite article as recited in claim 14, wherein the Si—Al—C—N solid solution composition and microstructure has a ratio, R, of silicon atoms to aluminum atoms that is $1 \leq R \leq 5$.

17. A composite article comprising:
- a substrate; and
- a protective layer disposed on the substrate, the protective layer having a silicon-aluminum-carbon-nitrogen-oxygen ("Si—Al—C—N—O") solid solution composition and microstructure.

* * * * *